US008607559B2

(12) United States Patent
Dybing

(10) Patent No.: US 8,607,559 B2
(45) Date of Patent: Dec. 17, 2013

(54) FLUID BYPASS SYSTEM

(75) Inventor: Philip James Dybing, Canton, MN (US)

(73) Assignee: Eaton Corporation, Cleveland, OH (US)

( * ) Notice: Subject to any disclaimer, the term of this patent is extended or adjusted under 35 U.S.C. 154(b) by 872 days.

(21) Appl. No.: 12/648,410

(22) Filed: Dec. 29, 2009

(65) Prior Publication Data

US 2011/0154816 A1 Jun. 30, 2011

(51) Int. Cl.
*F16D 31/02* (2006.01)
*F15B 13/04* (2006.01)

(52) U.S. Cl.
USPC .................................. 60/468; 60/463; 91/458

(58) Field of Classification Search
USPC ....................... 60/459, 462, 463, 468; 91/458
See application file for complete search history.

(56) References Cited

U.S. PATENT DOCUMENTS

| | | | | |
|---|---|---|---|---|
| 2,793,498 | A | | 5/1957 | Banker |
| 3,140,722 | A | | 7/1964 | Gordon |
| 3,524,465 | A | | 8/1970 | Sadler |
| 3,788,770 | A | | 1/1974 | Johnson et al. |
| 4,119,016 | A | | 10/1978 | Pfeil et al. |
| 4,171,708 | A | | 10/1979 | Pareja |
| 4,354,422 | A | | 10/1982 | Nishikawa |
| 4,440,453 | A | | 4/1984 | Adachi |
| 4,569,367 | A | | 2/1986 | Petro |
| 4,663,936 | A | | 5/1987 | Morgan |
| 4,667,365 | A | * | 5/1987 | Martinek ...................... 16/35 D |
| 5,156,177 | A | | 10/1992 | Bishoff |
| 5,197,284 | A | | 3/1993 | Cartner |
| 5,394,697 | A | | 3/1995 | Hirata |
| 5,456,077 | A | | 10/1995 | Bartlett |
| 5,540,049 | A | | 7/1996 | Lunzman |
| 5,701,933 | A | | 12/1997 | Lunzman |
| 5,996,343 | A | | 12/1999 | Kuras |
| 6,691,603 | B2 | | 2/2004 | Linerode et al. |
| 2004/0208754 | A1 | | 10/2004 | McFadden et al. |
| 2008/0083894 | A1 | | 4/2008 | Li et al. |

FOREIGN PATENT DOCUMENTS

| | | |
|---|---|---|
| EP | 1 022 395 A1 | 7/2000 |
| JP | 10-252706 | 9/1998 |

OTHER PUBLICATIONS

International Search Report and Written Opinion mailed Jun. 8, 2011.

* cited by examiner

*Primary Examiner* — Michael Leslie
(74) *Attorney, Agent, or Firm* — Merchant & Gould P.C.

(57) ABSTRACT

A method for actuating a bypass control valve assembly of a fluid system includes receiving a first input signal at an electronic control unit. The first input signal is related to an active position of a direction control valve that is in fluid communication with a fluid pump and a fluid actuation device. The directional control valve includes a neutral position that provides fluid communication between a fluid inlet port of the directional control valve and a fluid outlet port of the directional control valve. A second input signal is received at the electronic control unit. The second input signal is related to the rotational speed of the fluid pump. The second input signal is compared to a limit. A drain valve of a bypass valve assembly is actuated so that fluid communication between the fluid pump and a fluid reservoir through the bypass valve assembly is blocked.

12 Claims, 6 Drawing Sheets

FLUID BYPASS SYSTEM

BACKGROUND

On-highway and off-highway vehicles use conventional fluid systems to control various functions of the vehicle. For example, conventional fluid systems are used to control the rotation of fluid motors and the extension/retraction of linear actuators.

Many conventional fluid systems use a fixed displacement fluid pump to pump fluid to the various functions (e.g., fluid motor, linear actuator, etc.). When the functions (e.g., rotary and linear actuators, etc.) are not active, the fixed displacement fluid pump still pumps fluid. While the fluid pump still pumps fluid when the functions are inactive, fluid from the fluid pump is routed to a system reservoir. However, as a result of pressure losses inherent in the fluid system when the actuator functions are not active, fuel economy of the vehicle can be compromised.

SUMMARY

An aspect of the present disclosure relates to a method for actuating a bypass control valve assembly of a fluid system. The method includes receiving a first input signal at an electronic control unit. The first input signal is related to an active position of a direction control valve that is in fluid communication with a fluid pump and a fluid actuation device. The directional control valve includes a neutral position that provides fluid communication between a fluid inlet port of the directional control valve and a fluid outlet port of the directional control valve. A second input signal is received at the electronic control unit. The second input signal is related to the rotational speed of the fluid pump. The second input signal is compared to a limit. A drain valve of a bypass valve assembly is actuated so that fluid communication between the fluid pump and a fluid reservoir through the bypass valve assembly is blocked.

Another aspect of the present disclosure relates to a method of actuating an overspeed control function of a fluid system. The method includes providing a fluid system including a fluid reservoir, a fluid pump in fluid communication with the fluid reservoir, a fluid actuation device in selective fluid communication with the fluid pump and a directional control valve. The direction control valve includes a fluid inlet port in fluid communication with the fluid pump, a fluid outlet port in fluid communication with the fluid reservoir, a first control port in fluid communication with the fluid actuation device and a second control port in fluid communication with the fluid actuation device. The directional control valve includes a neutral position in which the fluid inlet port is in fluid communication with the fluid outlet port. An input signal, which is related to rotational speed of the fluid pump, is received at an electronic control unit. The input signal is compared to a limit. An overspeed function of an overspeed control valve assembly is activated when the input signal is greater than a limit. The overspeed function is adapted to circulate a portion of fluid from a fluid outlet of the fluid pump to a fluid inlet of the fluid pump.

Another aspect of the present disclosure relates to a fluid system. The fluid system includes a fluid reservoir, a fluid pump in fluid communication with the fluid reservoir, a directional control valve and a fluid actuation device. The direction control valve includes a fluid inlet port in fluid communication with the fluid pump, a fluid outlet port in fluid communication with the fluid reservoir, a first control port and a second control port. The directional control valve includes a neutral position in which the fluid inlet port is in fluid communication with the fluid outlet port. The fluid actuation device is in fluid communication with the first and second control ports of the directional control valve. A first flow path provides fluid communication between the fluid pump and the fluid inlet port of the directional control valve. A second flow path is in parallel to the first flow path. The second flow path is in fluid communication with the fluid pump and the fluid reservoir. A bypass valve assembly is disposed in the second flow path. The bypass valve assembly provides selective fluid communication between the fluid pump and the fluid reservoir. An overspeed control valve assembly is adapted to selectively circulate a portion of fluid from a fluid outlet of the fluid pump to a fluid inlet of the fluid pump. An electronic control unit is in electrical communication with the bypass valve assembly and the overspeed control valve assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DRAWINGS

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
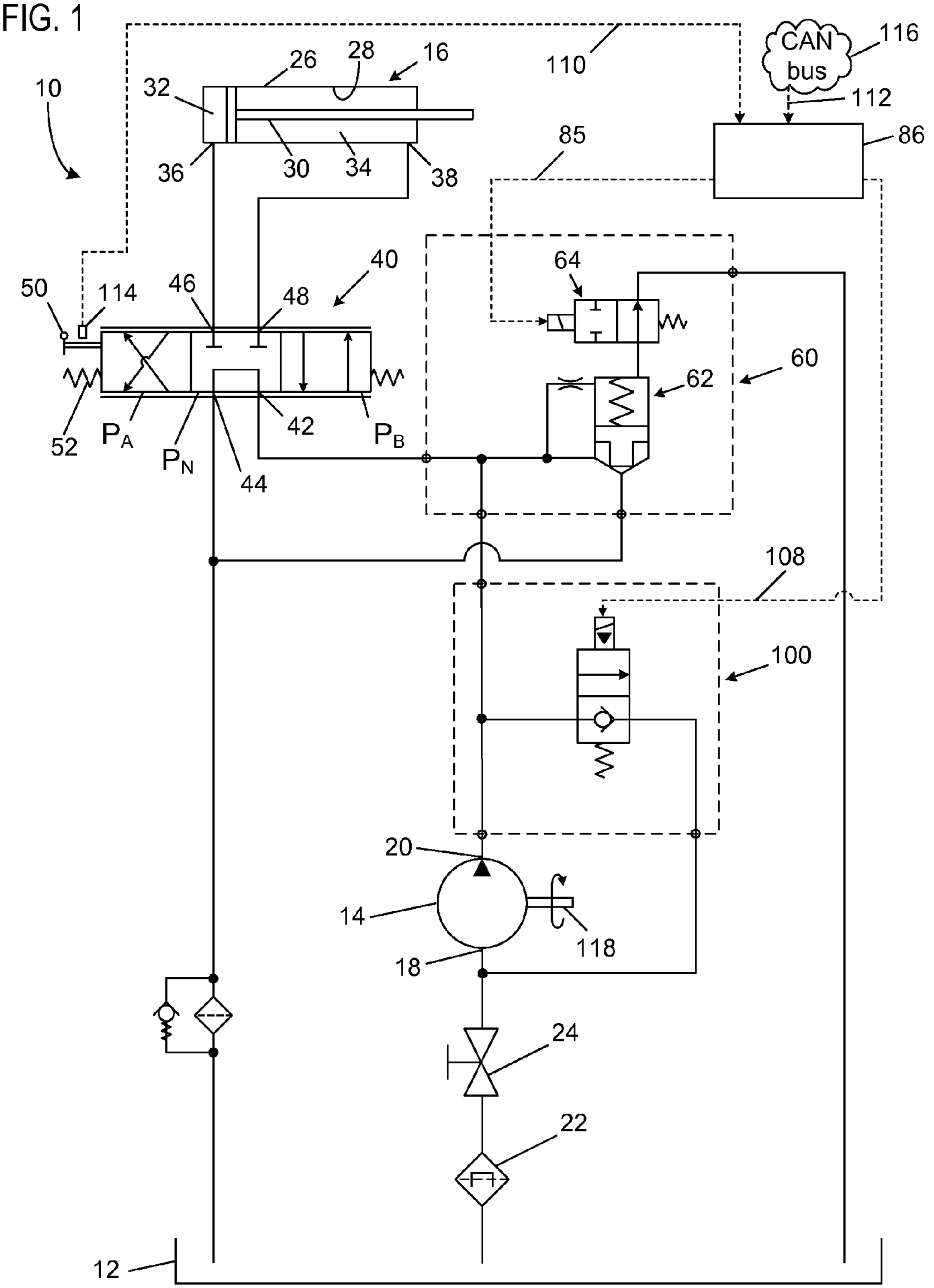
FIG. 1 is a schematic representation of a fluid system having exemplary features of aspects in accordance with the principles of the present disclosure.

Referring now to FIG. 1, a schematic representation of a fluid system, generally designated 10, is shown. The fluid system 10 is adapted for use on various on-highway (e.g., refuse trucks, buses, etc.) and off-highway vehicles (e.g., skid steers, forklifts, mini-excavators, etc.). The fluid system 10 includes a fluid reservoir 12, a fluid pump 14 and a fluid actuation device 16.

In the depicted embodiment, the fluid pump 14 is a fixed displacement pump. The fluid pump 14 includes a fluid inlet 18 and a fluid outlet 20. The fluid inlet 18 of the fluid pump 14 is in fluid communication with the fluid reservoir 12. In the depicted embodiment, a fluid filter 22 and a shutoff valve 24 are disposed between the fluid reservoir 12 and the fluid inlet 18 of the fluid pump 14.

The fluid outlet 20 is in fluid communication with the fluid actuation device 16. In the depicted embodiment, the fluid actuation device 16 is shown as a linear actuator 16 (e.g., a cylinder, etc.). It will be understood, however, that the fluid actuation device 16 could include a rotary actuator (e.g., a fluid motor, etc.).

The fluid actuation device 16 includes a housing 26 defining a bore 28. A piston assembly 30 is disposed in the bore 28. The piston assembly 30 separates the bore 28 into a first chamber 32 and a second chamber 34. In the depicted embodiment, the piston assembly 30 extends from the housing 26 of the fluid actuation device 16 when fluid from the fluid pump 14 is directed to the first chamber 32. The piston assembly 30 retracts when fluid from the fluid pump 14 is directed to the second chamber 34.

The fluid actuation device 16 further includes a first port 36 and a second port 38. The first port 36 is in fluid communication with the first chamber 32 while the second port 38 is in fluid communication with the second chamber 34.

The fluid system 10 further includes a control valve 40 that is in fluid communication with the fluid reservoir 12, the fluid pump 14 and the first and second ports 36, 38 of the fluid actuation device 16. In the subject embodiment, the control valve 40 is a directional control valve. In the depicted embodiment, the directional control valve 40 is a three-position, four-way valve.

The directional control valve 40 includes a fluid inlet port 42, a fluid outlet port 44, a first control port 46 and a second control port 48. The fluid inlet port 42 of the directional control valve 40 is in fluid communication with the fluid pump 14. The fluid outlet port 44 is in fluid communication with the fluid reservoir 12. The first control port 46 of the direction control valve 40 is in fluid communication with the first port 36 of the fluid actuation device 16 while the second control port 48 is in fluid communication with the second port 38 of the fluid actuation device 16.

In the depicted embodiment, the directional control valve 40 includes a plurality of active positions and a neutral position $P_N$. The active positions include a first position $P_A$ and a second position $P_B$. An actuator 50 (e.g., a lever, a steering wheel, a solenoid, pilot pressure, etc.) is adapted to actuate the directional control valve 40 between the first, second and neutral positions $P_A$, $P_B$, $P_N$. In the depicted embodiment, a plurality of centering springs 52 bias the directional control valve 40 to the neutral position $P_N$ when the actuator 50 is not actuated.

In the first position $P_A$, the directional control valve 40 provides fluid communication between the fluid pump 14 and the first chamber 32 of the fluid actuation device 16 and between the fluid reservoir 12 and the second chamber 34. In the depicted embodiment, the directional control valve 40 provides fluid communication between the fluid inlet port 42 of the directional control valve 40 and the first control port 46 and between the second control port 48 and the fluid outlet port 44.

In the second position $P_B$, the directional control valve 40 provides fluid communication between the fluid pump 14 and the second chamber 34 of the fluid actuation device 16 and between the fluid reservoir 12 and the first chamber 32. In the depicted embodiment, the directional control valve 40 provides fluid communication between the fluid inlet port 42 of the directional control valve 40 and the second control port 48 and between the first control port 46 and the fluid outlet port 44.

The directional control valve 40 is an open-center valve. As an open center valve, the directional control valve 40 provides fluid communication between the fluid pump 14 and the fluid reservoir 12 in the neutral position $P_N$. In the depicted embodiment, the directional control valve 40 blocks the first and second control ports 46, 48 in the neutral position $P_N$.

Figure 2:
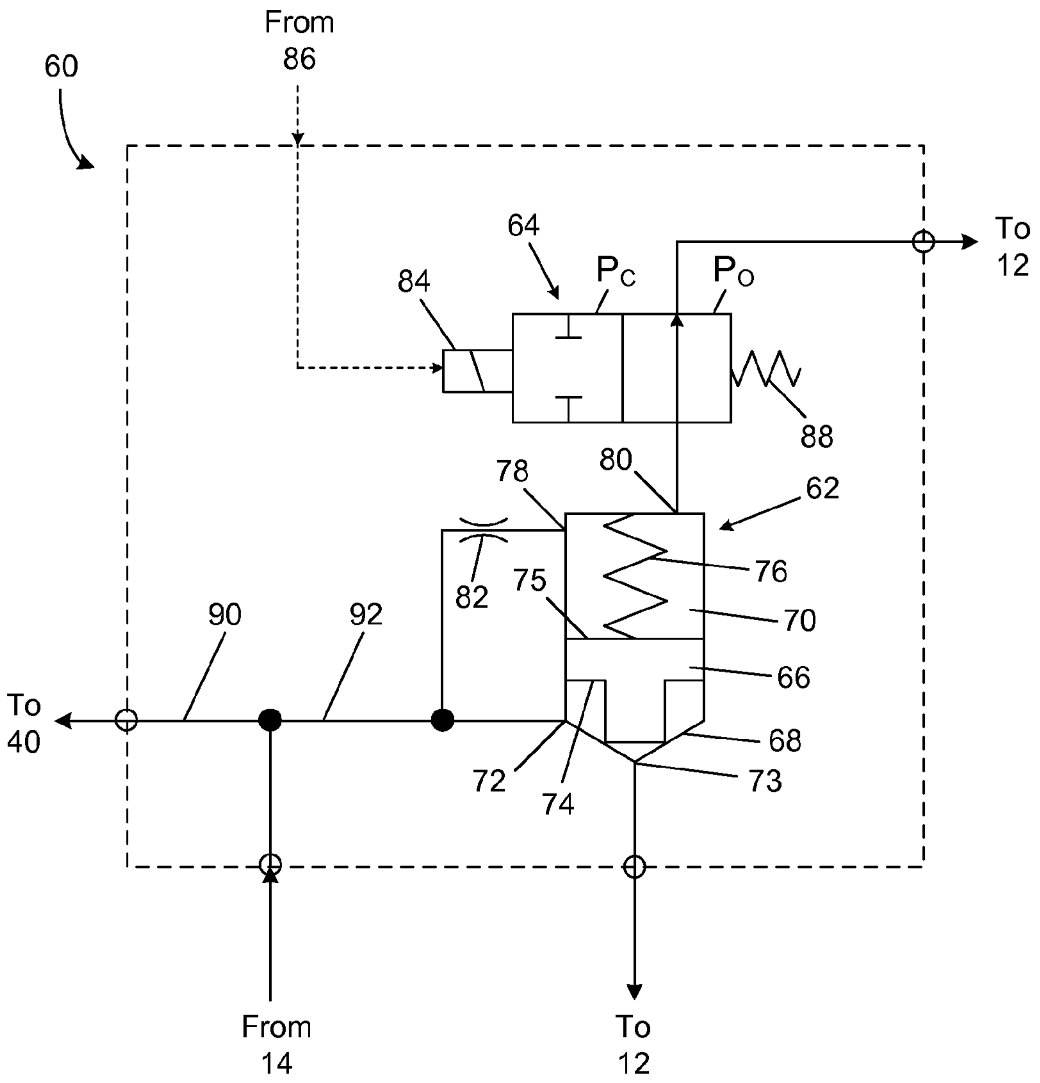
FIG. 2 is a schematic representation of a bypass valve assembly suitable for use in the fluid system of FIG. 1.

Referring now to FIGS. 1 and 2, a bypass valve assembly 60 is disposed downstream from the fluid pump 14 and upstream from the directional control valve 40. The bypass valve assembly 60 is adapted to selectively provide a path through which fluid from the fluid pump 14 bypasses the directional control valve 40 and is communicated to the fluid reservoir 12. In the depicted embodiment, the path provided by the bypass valve assembly 60 is disposed in parallel to the fluid path through the directional control valve 40. The bypass valve assembly 60 includes a poppet valve assembly 62 and a drain valve 64.

The poppet valve assembly 62 is adapted to provide selective fluid communication between the fluid pump 14 and the fluid reservoir 12. The poppet valve assembly 62 includes a poppet valve 66, a valve seat 68 and a spring cavity 70. The poppet valve assembly 60 further includes a fluid inlet 72 and a fluid outlet 73. In the depicted embodiment, the fluid inlet 72 is in fluid communication with the fluid pump 14 and the fluid outlet 73 is in fluid communication with the fluid reservoir 12.

The poppet valve 66 includes a first side 74 and an oppositely disposed second side 75. When the poppet valve 66 is in a seated position, the poppet valve 66 abuts the valve seat 68 so that fluid communication between the fluid inlet 72 and the fluid outlet 73 is substantially blocked. It will be understood that the term "substantially blocked" allows for slight leakage between the poppet valve 66 and the valve seat 68. When the poppet valve 66 is in an unseated position from the valve seat 68, the poppet valve 66 is displaced from (or lifted off) the valve seat 68 so that fluid is communicated between the fluid inlet 72 and the fluid outlet 73.

The spring cavity 70 of the poppet valve assembly 62 includes a spring 76 that is disposed in the spring cavity 70. The spring 76 acts against the second side 75 of the poppet valve 66 and biases the poppet valve 66 to the seated position. In the depicted embodiment, the spring 76 acts directly on the poppet valve 66.

The spring cavity 70 further includes an inlet 78 and an outlet 80. The fluid inlet 78 is in fluid communication with the fluid pump 14 while the outlet 80 is in selective fluid communication with the fluid reservoir 12. An orifice 82 is disposed upstream of the inlet 78 between the fluid pump 14 and the inlet 78.

The drain valve 64 is disposed between the outlet 80 of the spring cavity 70 of the poppet valve assembly 60 and the fluid reservoir 12. In the subject embodiment, the drain valve 64 is positioned downstream from the poppet valve assembly 60 and upstream from the fluid reservoir 12.

In the depicted embodiment, the drain valve 64 is a two-position, two-way valve. The drain valve 64 includes an open position $P_O$ and a closed position $P_C$. In the open position $P_O$, fluid is communicated from the outlet 80 of the spring cavity 70 of the poppet valve assembly 60 to the fluid reservoir 12. In the closed position $P_C$, the drain valve 64 blocks fluid communication between the outlet 80 of the spring cavity 70 of the poppet valve assembly 60 and the fluid reservoir 12. A solenoid 84 actuates the drain valve 64 between the open and closed positions $P_O$, $P_C$ in response to an electrical signal 85 received from an electronic control unit 86 (shown in FIG. 1), which will be described in greater detail subsequently. A spring 88 biases the drain valve 64 to one of the open and closed positions $P_O$, $P_C$. In the depicted embodiment, the spring 88 biases the drain valve 64 to the open position $P_O$.

The bypass valve assembly 60 further includes a first flow path 90 and a second flow path 92. The first flow path 90 provides fluid communication between the fluid pump 14 and the directional control valve 40. The second flow path 92 provides selective fluid communication between the fluid pump 14 and the fluid reservoir 12. The second flow path 92 is parallel to the first flow path 90.

In operation, with the poppet valve 66 in the seated position, fluid from the fluid pump 14 enters the poppet valve assembly 60 through the fluid inlet 72 and acts on the poppet valve 66 against the spring 76. Fluid is also directed to the spring cavity 70 of the poppet valve assembly 62 through the orifice 82 and the inlet 78 of the spring cavity 70. If the spring cavity 70 is filled with fluid and the drain valve 64 is in the closed position $P_C$, the fluid in the spring cavity 70 fluidly locks the poppet valve 66 in the seated position so that the fluid from the fluid inlet 72 that acts on the poppet valve 66 will not unseat the poppet valve 66 from the valve seat 68. As a result, fluid from the fluid pump 14 is directed through the first flow path 90 to the directional control valve 40.

If the drain valve 64 is actuated to the open position $P_O$, fluid in the spring cavity 70 drains to the fluid reservoir 12. With fluid in the spring cavity 70 in fluid communication with the fluid reservoir 12, pressure of fluid acting on the first side 74 of the poppet valve 66 unseats the poppet valve 66 from the valve seat 68 if the force resulting from the pressure of the fluid acting on the first side 74 of the poppet valve 66 is greater than the force of the spring 76 combined with the force from pressure of any fluid acting on the second side 75 of the poppet valve 66. With the poppet valve 66 unseated from the valve seat 68, fluid flows from the fluid inlet 72 to the fluid outlet 73 of the poppet valve assembly 62 and to the fluid reservoir 12 through the second flow path 92.

In the fluid system 10, pressure losses through the bypass valve assembly 60 are lower than pressure losses through the open-center directional control valve 40 in the neutral position $P_N$. As a result of this decreased pressure loss through the bypass valve assembly 60, fluid from the fluid pump 14 flows to the fluid reservoir 12 through the second flow path 92 of the bypass valve assembly 60 when the directional control valve 40 is in the neutral position $P_N$ and the drain valve 64 of the bypass valve assembly 60 is in the open position $P_O$. This decreased pressure loss through the bypass valve assembly 60 improves the efficiency of the fluid system 10 when fluid is not being supplied to the fluid actuator 16 by reducing parasitic fluid losses. This improvement in efficiency reduces fuel consumption.

Figure 3:
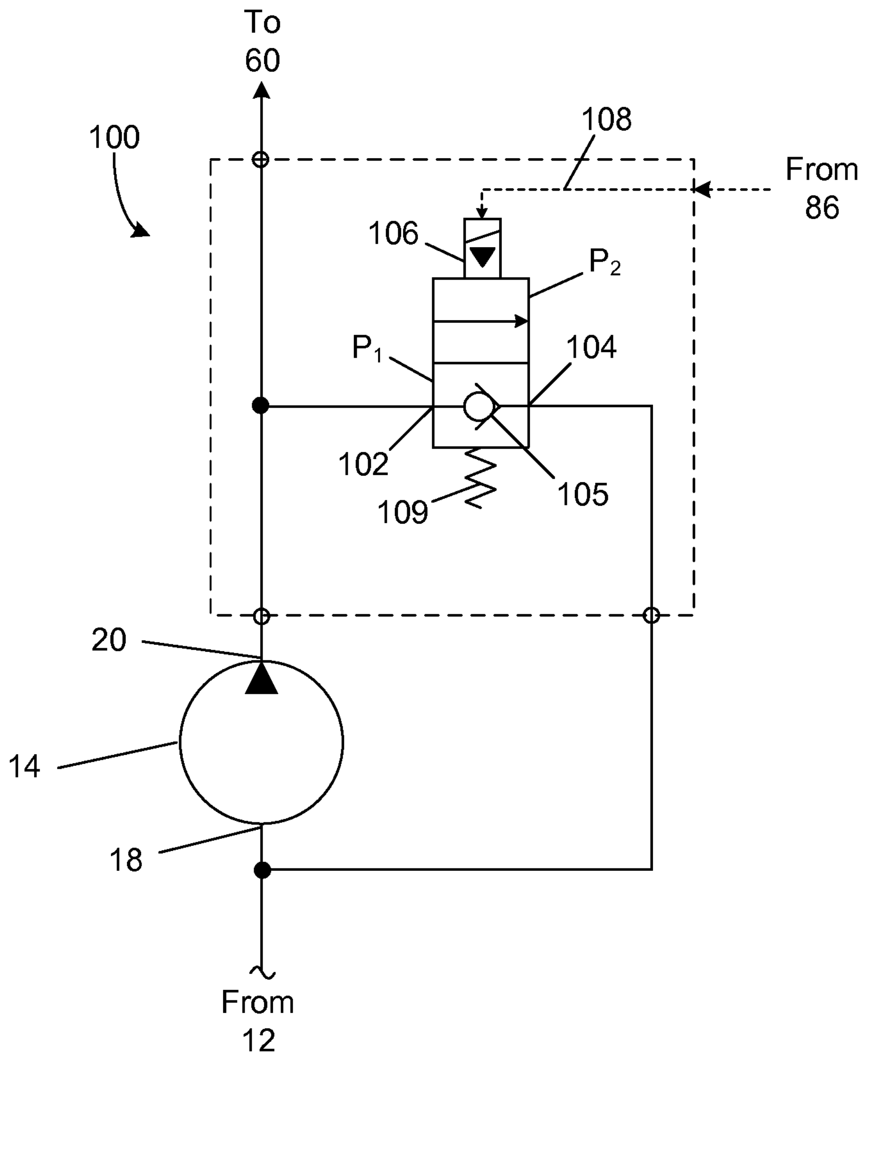
FIG. 3 is a schematic representation of an overspeed control valve assembly suitable for use in the fluid system of FIG. 1.
Figure 4:
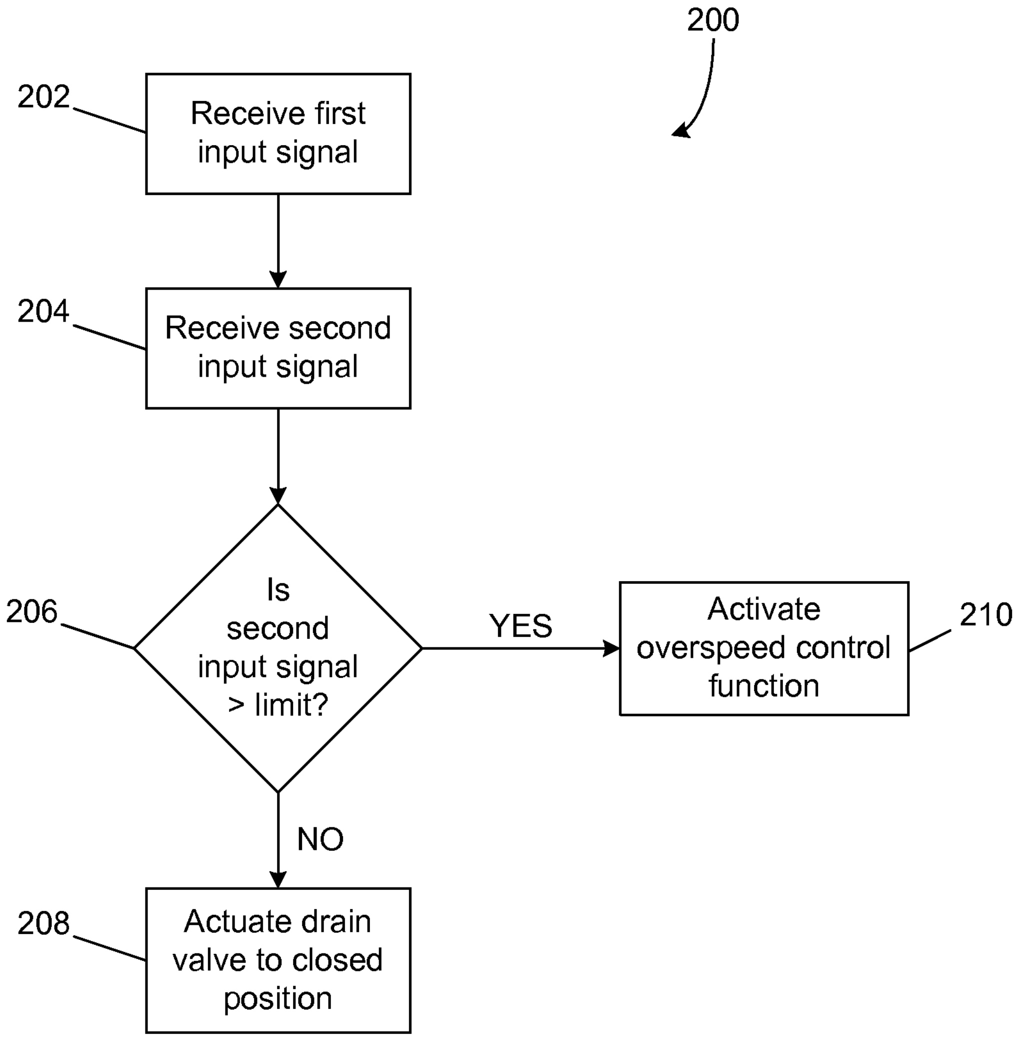
FIG. 4 is a representation of a method for actuating the bypass valve assembly and the overspeed control valve assembly.
Figure 5:
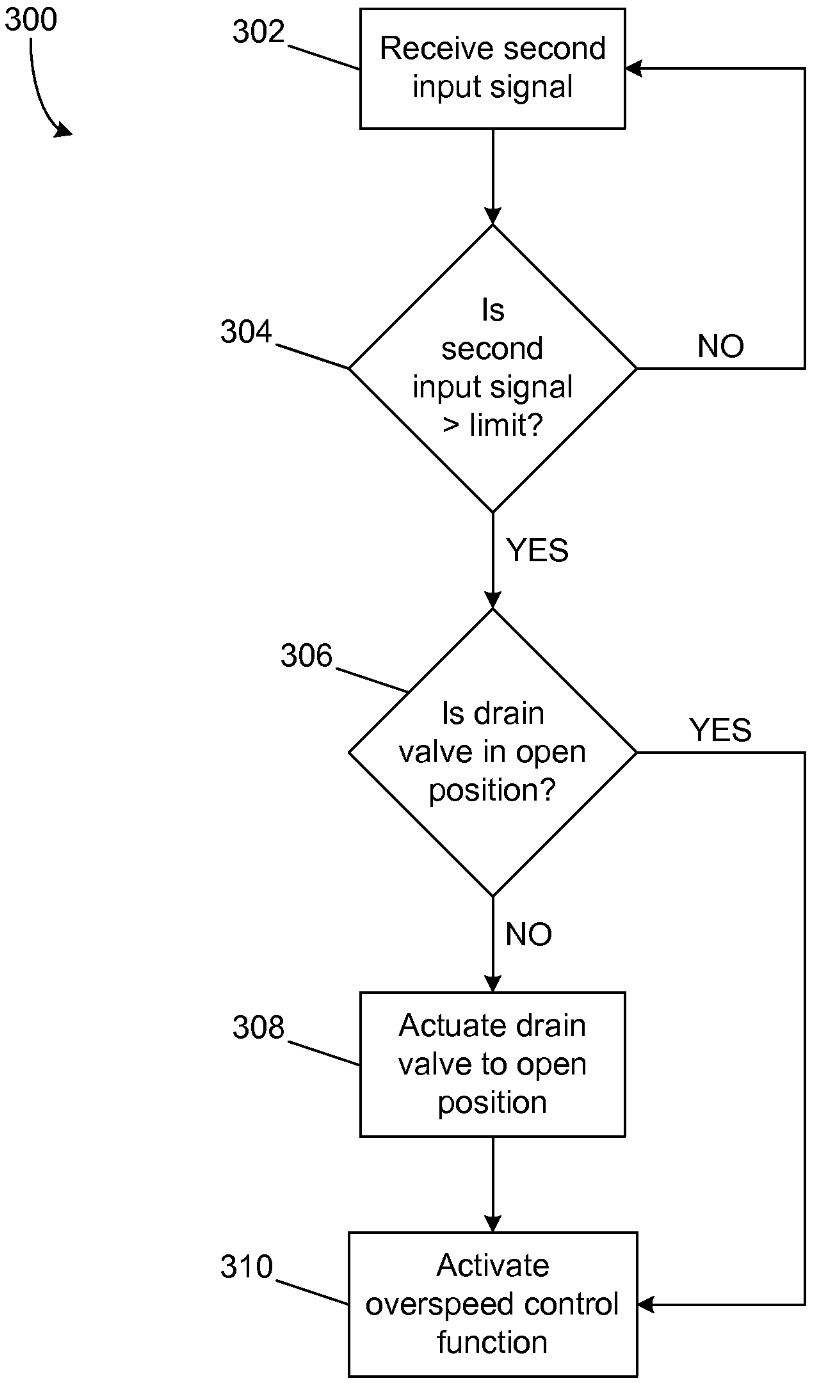
FIG. 5 is a representation of a method for activating an overspeed control function of the overspeed control valve assembly.
Figure 6:
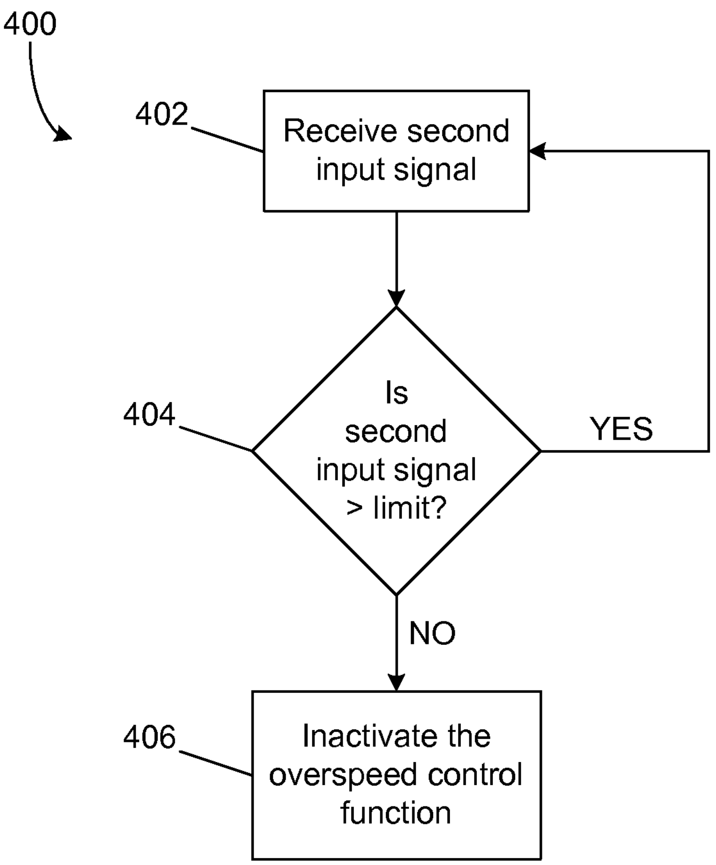
FIG. 6 is a representation of a method for inactivating the overspeed control function of the overspeed control valve assembly.

Referring now to FIGS. 1 and 3, the fluid system 10 further includes an overspeed control valve assembly 100. The overspeed control valve assembly 100 has an overspeed control function that is adapted to route fluid from the fluid outlet 20 of the fluid pump 14 to the fluid inlet 18 of the fluid pump 14 when an engine of a vehicle employing the fluid system 10 and/or the fluid pump 14 is rotating above an upper limit. By routing fluid from the fluid outlet 20 to the fluid inlet 18, the overspeed control function of the overspeed control valve assembly 100 reduces the risk of damage to the fluid pump 14 caused by cavitation.

In the depicted embodiment, the overspeed control valve assembly 100 is a two-position, two-way valve. The overspeed control valve assembly 100 includes a first fluid port 102 and a second fluid port 104. The first fluid port 102 of the overspeed control valve assembly 100 is in fluid communication with the fluid outlet 20 of the fluid pump 14 while the second fluid port 104 of the overspeed control valve assembly 100 is in fluid communication with the fluid inlet 18 of the fluid pump 14.

In a first position $P_1$, the overspeed control function of the overspeed control valve assembly 100 is inactive. In the depicted embodiment, however, the overspeed control valve assembly 100 in the first position $P_1$ functions as a one-way valve that permits fluid to flow in a direction from the fluid inlet 18 of the fluid pump 14 to the fluid outlet 20 of the fluid pump 14 (i.e., in a direction from the second fluid port 104 to the first fluid port 102 of the overspeed control valve assembly 100) without flowing through the fluid pump 14. In the first position $P_1$, fluid is prevented from flowing in the opposite direction (i.e., in a direction from the fluid outlet 20 to the fluid inlet 18) by a check valve 105. In the first position $P_1$, fluid can pass through the overspeed control valve assembly 100 without passing through the fluid pump 14 and be combined with the fluid from the fluid outlet 20 of the fluid pump 14. The passing of fluid through the first position $P_1$ of the overspeed control valve assembly 100 occurs only when the fluid actuation device 16 requires more fluid than what is being supplied by the fluid pump 14 (e.g., an overrunning load, etc.). The first position $P_1$ is potentially advantageous as it reduces the risk of damage to the fluid actuation device 16 in the event the fluid actuation device 16 requires more fluid than what is being provided by the fluid pump 14.

In a second position $P_2$, the overspeed control function of the overspeed control valve assembly 100 is active. The overspeed control function of the overspeed control valve assembly 100 circulates a portion of the fluid from the fluid outlet 20 of the fluid pump 14 to the fluid inlet 18. This overspeed control function allows fluid to flow in a direction from the first fluid port 102 to the second fluid port 104 of the overspeed assembly 100, thereby providing additional fluid to the fluid pump 14 when the fluid pump 14 is being rotated at speeds greater than the upper limit.

The overspeed control valve assembly 100 includes an actuator 106. In the depicted embodiment, the actuator 106 is a solenoid hydraulic pilot actuator. The actuator 106 is adapted to receive an electric signal 108 from the electronic control unit 86 (shown in FIG. 1). In response to the electric signal from the electronic control unit 86, the actuator 106 actuates the overspeed control valve assembly 100 between the first position $P_1$ and the second position $P_2$.

In the depicted embodiment, a spring 109 biases the overspeed control valve assembly 100 to the first position $P_1$. When the actuator 106 receives the electronic signal 108 from the electronic control unit 86, the actuator 106 overcomes the force provided by the spring 109 and moves the overspeed control valve assembly 100 from the first position $P_1$ to the second position $P_2$. The activation and inactivation of the overspeed control function of the overspeed control valve assembly 100 will be described in greater detail subsequently.

Referring now to FIG. 1, the electronic control unit 86 will be described. The electronic control unit 86 is adapted to receive inputs and to send outputs to the bypass valve assembly 60 and the overspeed control valve assembly 100. In the subject embodiment, the electronic control unit 86 receives a first input signal 110 and a second input signal 112 and outputs the electrical signals 85, 108 to the solenoid 84 of the drain valve 64 of the bypass valve assembly 60 and the actuator 106 of the overspeed control valve assembly 100, respectively.

The first input 110 is an electric or electronic signal from a sensor 114 (e.g., pressure sensor, pressure switch, proximity switch, etc.). In the depicted embodiment, the sensor 114 is a pressure sensor that monitors the actuator 50 of the directional control valve 40. When pressure (e.g., pneumatic or hydraulic) in the actuator 50 exceeds an upper limit, the sensor 114 sends the first input signal 110 to the electronic control unit 86.

In an alternate embodiment, the actuator 50 is a solenoid. In this embodiment, the solenoid is actuated by an electric or electronic signal in response to a desired input from a user. The electric or electronic signal transmitted to the actuator 50 is also transmitted to the electronic control unit 86. The electric or electronic signal sent to the electronic control unit 86 is received as the first input 110 at the electronic control unit 86.

The second input signal 112 relates to speed of the vehicle. In the depicted embodiment, the second input signal 112 is received from a vehicle CAN bus network 116. In an alternate embodiment, the second input signal 112 is received from a sensor that measures the rotation speed of a drive shaft 118 of the fluid pump 14 or the rotation speed of an engine that drives the drive shaft 118 of the fluid pump 14. When the rotation speed of the fluid pump 14 of the engine exceeds a limit, the electronic control unit 86 sends the electronic signal 108 to the overspeed control valve assembly 100.

Referring now to FIGS. 1-4, a method 200 of actuating the bypass valve assembly 60 and the overspeed control valve assembly 100 will be described. In step 202, the electronic control unit 86 assesses an actuation position of the directional control valve 40. In the subject embodiment, the electronic control unit 86 assesses whether the first input signal 110 from the sensor 114 is being received. The first input signal 110 is transmitted to the electronic control unit 86 when the directional control valve 40 is actuated to either the first or second positions $P_A$, $P_B$. Therefore, if the electronic control unit 86 receives the first input signal 110, the directional control valve 40 is in one of the first and second positions $P_A$, $P_B$.

In step 204, the electronic control unit 86 receives the second input signal 112 from the CAN bus network 116. As previously provided, the second input signal 112 provides information to the electronic control unit 86 regarding the rotational speed of the fluid pump 14 or the engine of the vehicle.

In step 206, the electronic control unit 86 compares the second input signal 112 to a limit. In the subject embodiment, the limit is a predefined upper limit related to rotational speed of the fluid pump 14 or the engine of the vehicle.

If the second input signal 112 is less than or equal to the limit, the electronic control unit 86 transmits the electronic signal 85 to the drain valve 64 of the bypass valve assembly 60 to actuate the drain valve 64 to the closed position $P_C$ in step 208. With the drain valve 64 in the closed position $P_C$ and the directional control valve 40 in the first or second position $P_A$, $P_B$, the fluid from the fluid pump 14 is communicated through the first flow path 90 to the fluid actuation device 16.

If the second input signal 112 is greater than the limit in step 206, the drain valve 64 remains in the open position $P_O$. With the drain valve 64 in the open position $P_O$, fluid from the fluid pump 14 bypasses the directional control valve 40 and is communicated to the fluid reservoir 12.

With the second input signal 112 greater than the limit and the drain valve 64 in the open position $P_O$, the overspeed control function of the overspeed control valve assembly 100 is activated. In the subject embodiment, the overspeed control valve function is activated by actuating the overspeed control valve assembly 100 to the second position $P_2$ in which a portion of the fluid circulates from the fluid outlet 20 of the fluid pump 14 to the fluid inlet 18 in step 210. The circulation of fluid from the fluid outlet 20 of the fluid pump 14 to the fluid inlet 18 reduces the risk of damage to the fluid pump 14 at high rotational speeds.

Referring now to FIGS. 1-3 and 5, a method 300 for activating the overspeed control function of the overspeed control valve assembly 100 will be described. In step 302, the second input signal 112 is received by the electronic control unit 86. In the depicted embodiment, the second input signal 112 is provided by the vehicle CAN bus network 116. In step 304, the second input signal 112 is compared to a limit. In the subject embodiment, the limit is a predefined upper limit related to rotational speed of the fluid pump 14 or the engine of the vehicle. If the second input signal 112 is greater than the limit, the electronic control unit 86 assesses the position of the drain valve 64 of the bypass valve assembly 60. In one embodiment, the electronic control unit 86 assesses whether the drain valve 64 is in the open position by assessing whether the electronic signal 85 is being transmitted to the drain valve 64. As the drain valve 64 is biased to the open position $P_O$, the lack of the electronic signal 85 being transmitted to the drain valve 64 would indicate that the drain valve 64 is in the open position $P_O$. If the drain valve 64 is in the closed position $P_C$, the drain valve 64 is actuated to the open position $P_O$ in step 308. In the depicted embodiment, the drain valve 64 is actuated to the open position $P_O$ by the spring 88.

With the drain valve 64 in the open position $P_O$, the electronic control unit 86 sends an electronic signal 108 to the actuator 106 of the overspeed control valve assembly 100 to actuate the overspeed control valve assembly 100 to the second position $P_2$, in which a portion of the fluid from the fluid outlet 20 of the fluid pump 14 circulates to the fluid inlet 18. In one embodiment, there is a predetermined time interval between the actuation of the drain valve 64 and the actuation of the overspeed control valve assembly 100. The predetermined time interval provides enough time to ensure that the drain valve 64 is in the open position $P_O$.

Referring now to FIGS. 1-3 and 6, a method 400 for inactivating the overspeed control function of the overspeed control valve assembly 100 will be described. In step 402, the second input signal 112 is received by the electronic control unit 86. In step 404, the second input signal 112 is compared to the limit. If the second input signal 112 is less than or equal to the limit, the overspeed control valve assembly 100 is actuated to the first position $P_1$ in step 406. In the depicted embodiment, the springs 109 of the overspeed control valve assembly 100 bias the overspeed control valve assembly 100 to the first position $P_1$. To inactivate the overspeed control valve assembly 100, the electronic control unit 86 stops sending the electronic signal 108 to the overspeed control valve assembly 100. The springs 109 then bias the overspeed control valve assembly 100 to the first position $P_1$.

After the overspeed control function of the overspeed control valve assembly 100 is inactivated, the drain valve 64 can be actuated to the closed position $P_C$ if the directional control valve 40 is being actuated to either the first or second position $P_A$, $P_B$. In one embodiment, the drain valve 64 is actuated to the closed position PC after a predetermined time interval.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A method for actuating a bypass control valve assembly of a fluid system, the method comprising:

receiving a first input signal at an electronic control unit, the first input signal being related to an active position of a directional control valve that is in fluid communication with a fluid pump and a fluid actuation device, wherein the directional control valve has a neutral position that provides fluid communication between a fluid inlet port of the directional control valve and a fluid outlet port of the directional control valve;

receiving a second input signal at the electronic control unit, the second input signal being related to rotational speed of the fluid pump;

comparing the second input signal to a limit; and actuating a drain valve of a bypass valve assembly so that fluid communication between the fluid pump and a fluid reservoir through the bypass valve assembly is blocked when the directional control valve is in the active position and the second input signal is less than the limit; wherein the bypass valve assembly includes a poppet valve assembly having a spring cavity, the drain valve providing selective fluid communication between the spring cavity and the fluid reservoir, wherein an electronic signal from the electronic control unit actuates the drain valve to a closed position so that a poppet valve of the poppet valve assembly is fluidly locked in a seated position.

2. The method of claim 1, wherein the second input signal relates to engine speed.

3. The method of claim 2, wherein the second input signal is provided from a CAN bus network of a vehicle.

4. The method of claim 1, wherein the fluid actuation device is a linear actuator.

5. A fluid system comprising:

a fluid reservoir;

a fluid pump in fluid communication with the fluid reservoir;

a directional control valve including a fluid inlet port in fluid communication with the fluid pump, a fluid outlet port in fluid communication with the fluid reservoir, a first control port and a second control port, the directional control valve including a neutral position in which the fluid inlet port is in fluid communication with the fluid outlet port;

a fluid actuation device in fluid communication with the first and second control ports of the directional control valve;

a first flow path providing fluid communication between the fluid pump and the fluid inlet port of the directional control valve;

a second flow path in parallel to the first flow path, the second flow path being in fluid communication with the fluid pump and the fluid reservoir;

a bypass valve assembly disposed in the second flow path, the bypass valve assembly providing selective fluid communication between the fluid pump and the fluid reservoir, wherein the bypass valve assembly includes: a poppet valve assembly having a poppet valve, a valve seat and a spring cavity; a drain valve in fluid communication with the spring cavity, the drain valve providing selective fluid communication between the spring cavity and the fluid reservoir;

an overspeed control valve assembly adapted to selectively circulate a portion of fluid from a fluid outlet of the fluid pump to a fluid inlet of the fluid pump; and an electronic control unit in electrical communication with the bypass valve assembly and the overspeed control valve assembly.

6. The fluid system of claim 5, wherein the electronic control unit provides a signal to the drain valve to block fluid communication between the spring cavity and the fluid reservoir when the directional control valve is in a position other than the neutral position.

7. The fluid system of claim 5, wherein the electronic control unit provides a signal to the overspeed control valve assembly when the bypass valve assembly is in an open position and a rotational speed of the fluid pump exceeds a limit.

8. The fluid system of claim 5, wherein the electronic control unit receives a first input signal related to an actuation position of the directional control valve and a second input signal related to a rotational speed of the fluid pump.

9. The fluid system of claim 8, wherein the second input signal is provided by a CAN bus network.

10. The fluid system of claim 8, wherein the first input signal is provided by a sensor.

11. A method of activating an overspeed control function of a fluid system, the method comprising:

providing a fluid system including:

a fluid reservoir;

a fluid pump in fluid communication with the fluid reservoir;

a directional control valve in fluid communication with the fluid reservoir and fluid pump;

a fluid actuation device in fluid communication with the directional control valve;

a first flow path providing fluid communication between the fluid pump and the directional control valve;

a second flow path in parallel to the first flow path, the second flow path being in fluid communication with the fluid pump and the fluid reservoir;

a bypass valve assembly disposed in the second flow path, the bypass valve assembly providing selective fluid communication between the fluid pump and the fluid reservoir, wherein the bypass valve assembly includes: a poppet valve assembly having a poppet valve, a valve seat and a spring cavity; a drain valve in fluid communication with the spring cavity, the drain valve providing selective fluid communication between the spring cavity and the fluid reservoir;

an overspeed control valve assembly adapted to selectively circulate a portion of fluid from a fluid outlet of the fluid pump to a fluid inlet of the fluid pump; and an electronic control unit in electrical communication with the bypass valve assembly and the overspeed control valve assembly;

receiving an input signal at the electronic control unit, the input signal being related to rotational speed of the fluid pump;

comparing the input signal to a limit;

assessing a position bypass valve assembly drain valve and ensuring that the drain valve is in an open position when the input signal is greater than the limit;

activating an overspeed control function of the overspeed control valve assembly once the drain valve is in the open position, wherein the overspeed control function circulates a portion of fluid from a fluid outlet of the fluid pump to a fluid inlet of the fluid pump; and deactivating the overspeed control function of the overspeed control valve assembly when the input signal is less than or equal to the limit.

12. The method of claim 11, wherein the input signal is provided from a CAN bus network of a vehicle.

* * * * *